(12) United States Patent
Aladas

(10) Patent No.: US 10,699,560 B2
(45) Date of Patent: *Jun. 30, 2020

(54) INTEGRATED ACCESSIBLE PEDESTRIAN SYSTEM

(71) Applicant: Mohamad Motaz Aladas, Ottawa (CA)

(72) Inventor: Mohamad Motaz Aladas, Ottawa (CA)

(73) Assignee: Key2Access inc., Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/606,098

(22) Filed: Jan. 27, 2015

(65) Prior Publication Data

US 2020/0090500 A1    Mar. 19, 2020

Related U.S. Application Data

(60) Provisional application No. 62/075,311, filed on Nov. 5, 2014.

(51) Int. Cl.
| | |
|---|---|
| *G08G 1/005* | (2006.01) |
| *G08G 1/07* | (2006.01) |
| *G08G 1/095* | (2006.01) |
| *G09B 21/00* | (2006.01) |

(52) U.S. Cl.
CPC ............... *G08G 1/005* (2013.01); *G08G 1/07* (2013.01); *G08G 1/095* (2013.01); *G09B 21/001* (2013.01); *G09B 21/003* (2013.01); *G09B 21/006* (2013.01); *G09B 21/007* (2013.01)

(58) Field of Classification Search
CPC .......... G08G 1/005; G08G 1/07; G08G 1/095; G09B 21/001; G09B 21/003; G09B 21/006; G09B 21/007

See application file for complete search history.

(56) References Cited

U.S. PATENT DOCUMENTS

| | | | |
|---|---|---|---|
| 6,340,936 B1 * | 1/2002 | McGaffey et al. | 340/944 |
| 8,786,466 B1 | 7/2014 | Aladas | |
| 2006/0028357 A1 * | 2/2006 | Beckwith et al. | 340/944 |
| 2008/0218380 A1 * | 9/2008 | Wall et al. | 340/907 |
| 2011/0140924 A1 * | 6/2011 | Sennett et al. | 340/944 |
| 2011/0148660 A1 * | 6/2011 | Tate et al. | 340/906 |
| 2012/0223843 A1 * | 9/2012 | Wall et al. | 340/944 |
| 2013/0275032 A1 * | 10/2013 | Yorke et al. | 701/119 |

* cited by examiner

*Primary Examiner* — Andrew W Bee

(57) ABSTRACT

An integrated pedestrian access system comprising of wireless push buttons adapted to transmit and receive wireless signals and receivers connected to pedestrian crosswalk signal systems, wherein said one or more receivers are configured to communicate with the wireless push buttons through wireless signals, communicate among the receivers, determine whether source device from which a request for registering a pedestrian signal is received through the said communication is the wireless push button or the receivers, determine status of pedestrian signal based on signals received from the pedestrian signal system, register request for pedestrian crosswalk signal if walk signal of the pedestrian signal is not on in the desired direction as per the status of pedestrian signal and provide acknowledgement corresponding to the status of pedestrian signal through the said source device.

25 Claims, 4 Drawing Sheets

INTEGRATED ACCESSIBLE PEDESTRIAN SYSTEM

CROSS-REFERENCE TO RELATED APPLICATIONS

This application claims the benefit of U.S. Provisional Application No. 62/075,311, filed Nov. 5, 2014, the contents of which are incorporated herein by reference.

FIELD OF THE INVENTION

The present invention relates to traffic control systems. More particularly, the present invention relates to integrated wired and wireless accessible pedestrian system.

BACKGROUND OF THE INVENTION

Signs and signals are installed at pedestrian crosswalks for facilitating safe and smooth crossing of street by pedestrians. Pedestrian crosswalk signals can be of automatic type where the WALK/DON'T WALK signals come at a pre-defined interval or can be of manual type where the crosswalk signal system is triggered manually by pedestrians when they press a pedestrian push button installed near the crosswalk. There are various types of pedestrian push button systems known in the prior art which have been built to make the pedestrian crosswalk signal systems accessible for the visually and/or hearing impaired pedestrians.

However, there was no pedestrian push button system available which could be activated from a distance. As a solution to this problem, a wireless push button device for pedestrian crosswalk signal system was invented that is capable of giving alert to the users of the remote to confirm WALK/DON'T WALK in the form of audio, tactile and visual signals. This wireless push button device for pedestrian crosswalk signal system is disclosed in detail in U.S. Pat. No. 8,786,466 issued Jul. 22, 2014 to the inventor and applicant of this present application.

To provide the visually and/or hearing impaired pedestrians same kind of facilities as those provided by the above mentioned wireless push button, even without possessing the remote push button, it is now desirable that the features of the above mentioned wireless push button device are also incorporated into a traffic signal pole mounted pedestrian push button system.

OBJECTS OF THE INVENTION

An object of the present invention to provide a system and method for an accessible pedestrian system integrated to support both wireless pedestrian push button and pole mounted pedestrian push button.

Yet another object of the present invention is to provide a system and method for an accessible pedestrian system to enable registration of a request for pedestrian crosswalk signal through multiple means.

Still another object of the present invention is to provide a system and method for an accessible pedestrian system which provides pedestrian signal information in multiple formats.

These as well as other objects of the present invention are apparent upon inspection of this specification, including the drawings and appendices attached hereto.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to an accessible pedestrian system and method which facilitates users, particularly visually impaired and/or hearing impaired pedestrians, to register a request for pedestrian signal, both from a distance as well as locally, and to know about the status of the pedestrian signal in the form of visual, audible and tactile messages.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which.

DETAILED DESCRIPTION OF THE INVENTION

Glossary

The following is a brief glossary of terms used herein.

Pedestrian Signal: Pedestrian signals help pedestrians cross at intersections with traffic lights.

Accessible Pedestrian System: Accessible pedestrian system comprises of devices that communicate information about the WALK and DON'T WALK intervals at intersections in non-visual formats to pedestrians.

Wireless Push Button or Remote Push Button: A device that enables registration of a pedestrian signal call request from a distance wirelessly. It also provides pedestrian signal status information in visual, audible and tactile forms.

Receiver or Pedestrian Push Button Assembly: It is device that facilitates registration of a pedestrian signal request and also provides pedestrian signal status information. The receiver allows registration of pedestrian signal request locally by means of a push button or from a wireless push button. The receiver also provides pedestrian signal status information in visual, audible and tactile forms.

Traffic Controller: System of using traffic lights for controlling traffic movement at intersections.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention.

Thus, the present invention is not intended to be limited to the embodiments shown, but is to be accorded the widest scope consistent with the principles and features disclosed herein.

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Figure 1:
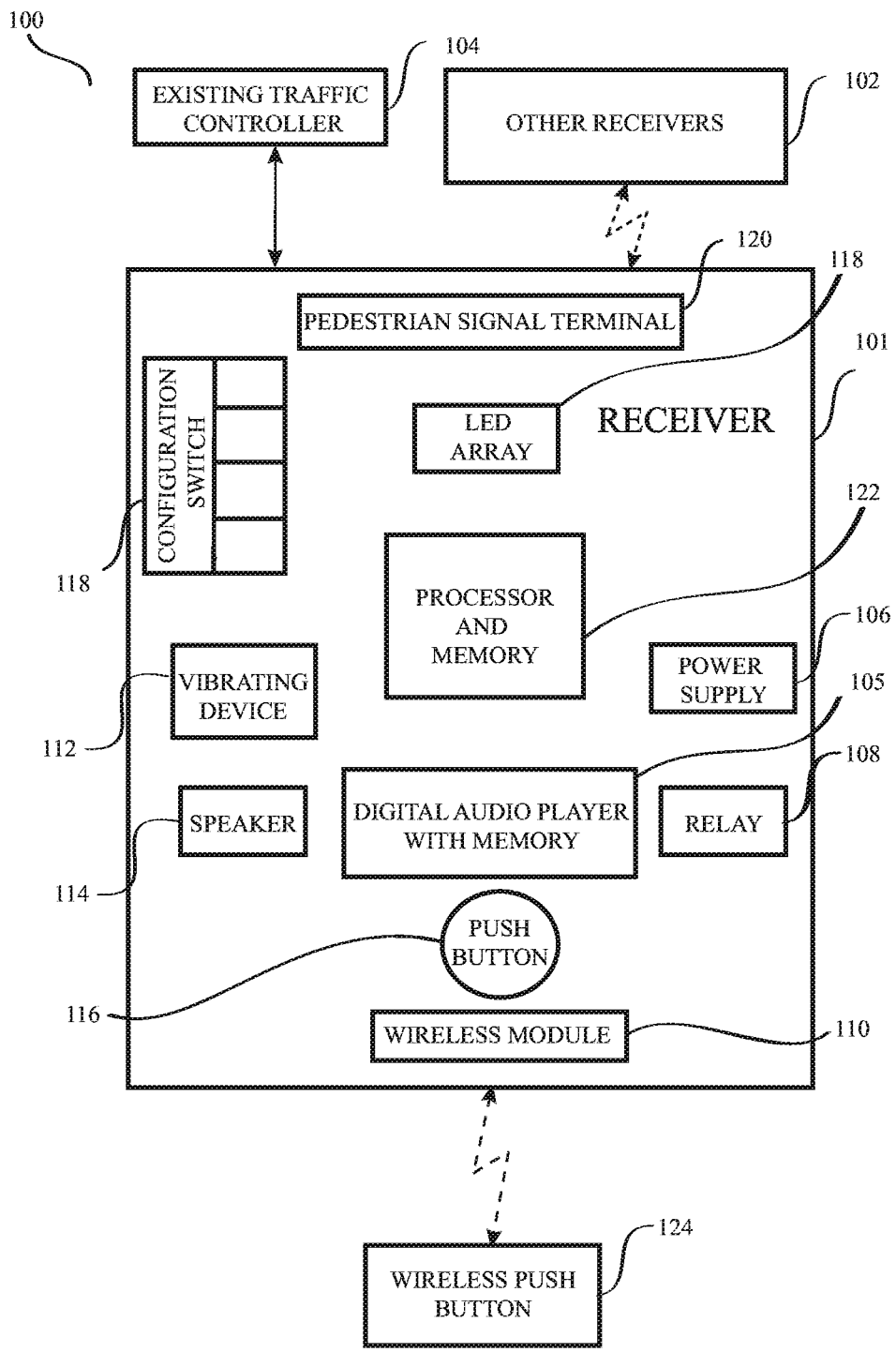
FIG. 1 is a block diagram of the integrated accessible pedestrian system of the present invention along with other interacting components.
Figure 2:
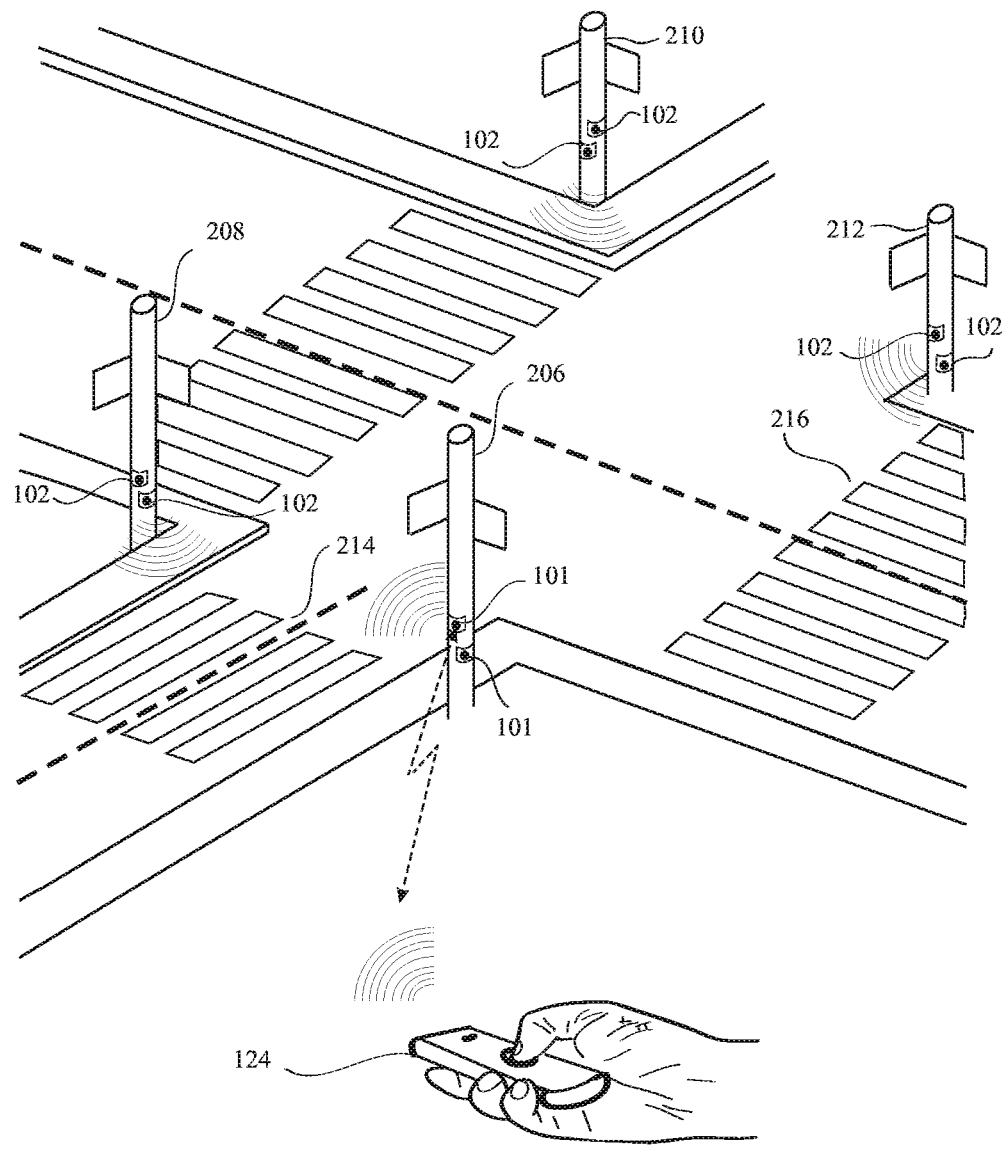
FIG. 2 illustrates a general environment for implementing the principles of the present invention.

FIG. 1 and FIG. 2 illustrate an integrated accessible pedestrian system 100. The integrated accessible pedestrian access system 100 of the present invention includes one or more traffic pole mounted pedestrian push button assemblies 101 (hereinafter referred to as receivers 101), one or more wireless push button assemblies 124 (hereinafter referred to as wireless push button 124 or remote 124) known in the art wherein the one or more receivers 101 are communicatively connected to one or more existing traffic controllers 104. As shown in FIG. 1, the receiver 101 includes a wireless module 110 for receiving and transmitting signals wirelessly, a push button 116 for registering a request for pedestrian signal, a speaker 114 to play audio from digital audio player 105; the digital audio player 105 also includes provision for memory to store digital audio and video files, one or more relays 108 for switching purpose, one or more processors 122, one or more vibrating device 112 which can make the body and front plate of the receiver 101 vibrate, one or more arrays of Light Emitting Diode (LED) or any source of light 118 to indicate pedestrian signal status, and one or more configuration switches 118 required for setting the direction details in receiver 101 as per requirement. The receiver 101 interacts with the existing traffic controller 104 through connections made from the traffic controller 104 to register a request for pedestrian signal and also communicates with the existing one or more traffic/pedestrian signal heads through the pedestrian signal terminal 120 to check for status of the pedestrian signal as well to check existence of any conflict in the pedestrian signals. The wireless push button 124 used here is the one envisioned through U.S. Pat. No. 8,786,466 or ay such wireless device. The push button 116 can be a capacitor switch or a regular switch.

Figure 3A:
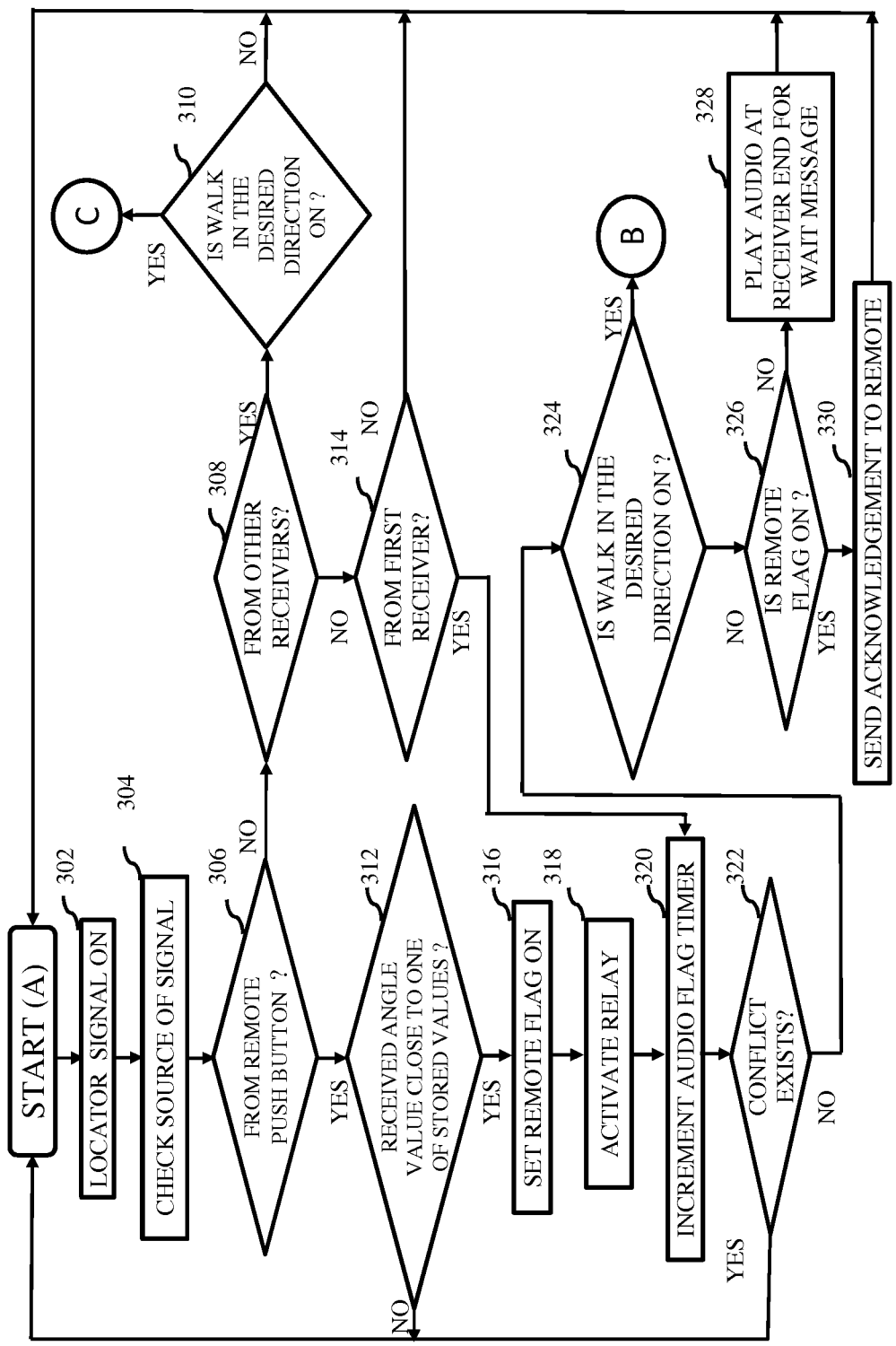
FIG. 3A and FIG. 3B show a flow diagram illustrating the functioning of the integrated accessible pedestrian system in accordance with an embodiment of the present invention.

Reference to FIG. 1 and FIG. 2, in the exemplary environment, one or more receivers 101 are mounted on existing traffic signal poles 206, 208, 210 and on 212. For explanation purpose, receiver 101 mounted on traffic poles other than 206 i.e. those installed at traffic poles 208, 210 and 212, are referred to as receiver 102 although their functionality remains same as that with the one installed at traffic pole 206. Also, alternatively, receiver 101 is sometimes hereinafter referred to as first receiver 101 and the rest of the receivers 102 are collectively referred to as other receivers 102. The working principle of the present invention is described hereinafter taking an example of a visually impaired and/or hearing impaired person approaching a traffic intersection with intent to cross the street through crosswalk 214 from the traffic pole side 206 as shown in FIG. 2. The said pedestrian can use a wireless push button 124 to register a request for pedestrian signal from a distance. Alternatively, the pedestrian can use the push button on the receiver 101 installed in the traffic pole 206 to register a request for pedestrian signal. As shown at step 302 of FIG. 3A, the receivers 101 keep on emitting a continuous or periodic locator tone to announce its presence as soon as it is turned on and this locator tone helps in locating the receivers 101. As in step 304 of FIG. 3A, the receiver 101 continuously keeps on checking to determine the source device from which request signal is received by the receiver 101 for registration of pedestrian signal. The source device transmitting the request signal can be the push button 116 of receiver 101, the one or more wireless push buttons 124 and/or the one or more similar receivers 102 installed at the other traffic poles at the intersection. The angle values, with respect to the crosswalk directions, are stored in the receivers 101 with the help of configuration switches 118 at the time of installation or by using a special device to remotely configure the configuration of the receivers 101. If the said person uses the wireless push button 124, then he/she has to point the wireless push button 124 towards the crosswalk direction 214 and press the wireless push button 124. The wireless push button 124 then calculates and transmits the value of the angle to the receivers 101. As in step 306 of FIG. 3A, if the receiver 101 on traffic pole 206 finds that the signal received by it is from the wireless push button (wireless push button is also referred to as remote push button alternatively hereinafter) 124, the angle value received from the wireless push button 124 is compared by the processor 122 with those stored for the crosswalk directions 214 and 216. If the received angle value is found to be within a predetermined range of values close to the actual angle value stored in the receivers 101 for direction 214 as in step 312, then the processor 122 sets a flag (hereinafter referred to as remote flag) on to indicate that the signal was received from the wireless push button 124 as in step 316 and also closes the relay 108 to register the request for a pedestrian signal as in step 318. The processor 122 also increments an audio timer by the amount of time the wireless push button was pressed by the user as in step 320.

Figure 3B:
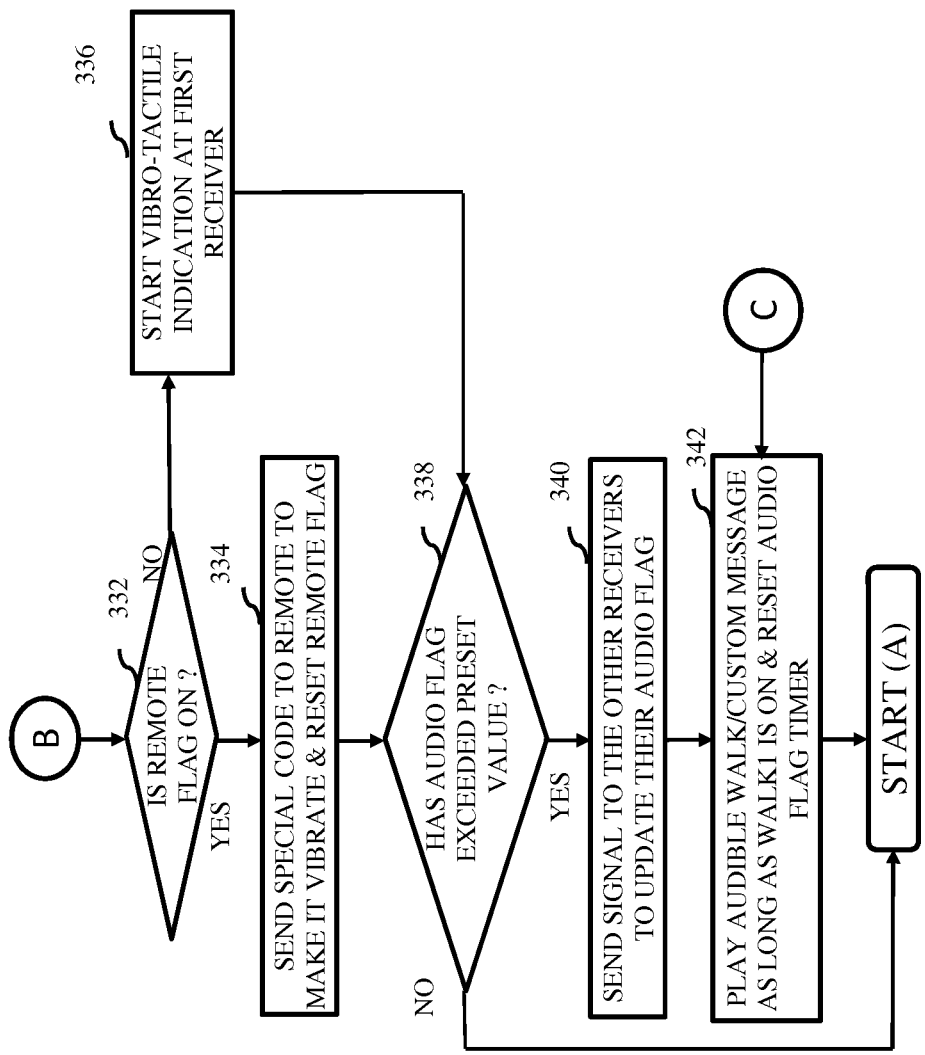

The one or more receivers 101 or 102 installed can interact among themselves wirelessly. As such, as in step 308, if the receiver 101 finds that the signal received is not from a wireless push button 124, but from another receiver 102 installed at any of the traffic poles 208, 210 or 212, and is for the intended direction 214, then the receiver 101 checks to verify if the pedestrian signal in the desired crosswalk direction 214 (hereinafter the signal in the direction 214 is referred to as WALK1 alternatively) is already on (i.e. WALK1 is on) as in step 310. If the WALK1 is found to be on at that moment of time then the audio player 105 included in the receiver 101 plays a message stored in the memory of the audio player 105 to indicate that the WALK1 is on as in step 342 of FIG. 3B. This message is played as long as the WALK1 remains on. The audio message played can include any type of message, including but not limited to, recorded human voice or any other types of sound and can be stored in electronic format in the SD card or in any other memory device.

If the receiver 101 finds, as in step 314, that the said person has actually pressed the push button 116 (i.e. signal is from the first receiver 101 itself), then the audio flag timer is incremented accordingly as in step 320 by the processor 122.

The receiver 101 then checks for any conflict or malfunction that may exist in the existing traffic/pedestrian signal systems from the inputs received through pedestrian signal terminals 120 as in step 322. For example, crosswalk 214 can be considered unsafe for pedestrians if the Do Not Walk signal and Walk signal for the same crosswalk 214 are on at the same time. Similarly, the crosswalk 214 is considered unsafe if walk is on in both directions 214 and 216 together. After confirming that there exists no conflict or malfunction in the pedestrian/traffic signals, the receiver 101 again checks if the WALK1 is on at that moment as in step 324. On finding WALK1 on, the receiver 101 then finds whether the request for registering pedestrian signal was received from the wireless push button 124 or from the receiver 101 itself, as in step 332 of FIG. 3B, by checking the status of the remote flag. If the request was received due to pressing of push button 116 on the receiver 101 itself, then the vibrating device 112, which can be a vibrating motor, is turned on to make the body of the receiver 101 or any part thereof vibrate as an acknowledgement as in step 336. This vibro-tactile indication lets the user of the receiver 101, who can be a visually impaired and/or hearing impaired person, know that the Walk is on in the desired direction. If the WALK1 is on and the request received was from the wireless push button 124, then a special code is transmitted through the wireless module 110 to the wireless push button 124 to make the wireless push button 124 give vibro-tactile indication to the user as in step 334 of FIG. 3B. At the same time, the remote flag is also reset.

In a preferred embodiment, every wireless push button 124, while transmitting the value of the angle of direction, would also transmit a unique number or code or identity (hereinafter referred to as a unique wireless push button identification code) which can distinguish one wireless push button 124 from every other such wireless push buttons which may be active in the same area at the same time. Every receiver, be it receiver 101 or 102, receiving the signals from the one or more wireless push buttons 124, would respond to the wireless push buttons 124 with a code unique to each of the receivers, the code being hereinafter referred to as a unique receiver identification code. Among all the receivers responding, a wireless push button 124 would establish an association with the only receiver from which the wireless push button receives the acknowledgement first. Once an association is established between a wireless push button and a receiver, only that receiver would do the ensuing communication with the wireless push button with which the receiver has an association. Since every wireless push button carries a unique identity, based on that identity, a receiver can establish independent association with multiple wireless push buttons simultaneously. The said phenomenon of establishing association between receiver and wireless push button ensures that the integrated pedestrian access system of the present invention remains congestion free in terms of functioning of multiple wireless push buttons and multiple receivers simultaneously. In some embodiments, using the same aforementioned method, the association or pairing between a wireless push button and a receiver can be established through any other wireless data exchange standards such as Bluetooth, Zigbee, IrDA etc. In a preferred embodiment, all the communications occurring among the devices i.e. among the one or more receivers, among one or more receivers and one or more wireless push buttons are encrypted.

Be it from the wireless push button 124 or from the push button on the receiver 101, on receipt of a call for registration of pedestrian signal request by the receiver 101, the processor 122 also checks if the audio flag timer has exceeded a preset value (e.g. 3 seconds) as in step 338. In some preferred embodiments, there can be provided separate audio timers for the wireless push button 124 and for the receivers 101. If the said user keeps the push button 116 or wireless push button 124 pressed for a certain period of time that exceeds the preset or predetermined value (e.g. if pressed for 4 seconds when the preset value is 3 seconds), then a signal is transmitted through the wireless module 110 to the other receivers 112 as in step 340. This signal is sent for updating the audio flags in the other receivers 102 so that, when the preset value is exceeded, the other relevant receiver 102, along with the pole pedestrian push button 101, play the audio signal at their ends as in step 342 to inform the users that the Walk is on in the desired direction of crosswalk. The present invention ensures that all the receivers in the desired walk direction play the same audio signal and a pedestrian can hear the audio no matter whether the pedestrian is near or away from the first receiver while walking through the desired crosswalk. In one preferred embodiment of the present invention, when one receiver becomes master and informs all other receivers to play walk tune when the walk is on, only the receivers in the same direction of crosswalk would listen and rest of the receivers will ignore the message. For example, if North-South direction crosswalk receiver sends a message, then only the other receivers for North-South crosswalk direction would record the message and the East-West direction receivers would ignore the message.

In some embodiments, the receiver 101 can also play audio messages to indicate Flash Do Not Walk for a certain period of time or till the solid Do Not Walk signal comes on.

If the receiver 101 finds that no conflict exists on checking as in step 322 and the WALK1 is found off while further checking as in step 324, it is again checked to find out if the call for registration of pedestrian signal request came from the wireless push button 124 (i.e. whether the remote flag is on) as in step 326. If the call came due to pressing of wireless push button 124, then a message is sent back to the wireless push button 124 to acknowledge that a pedestrian signal request has been registered and to wait for the pedestrian signal to come as in step 330. In some preferred embodiments of the present invention, the acknowledgement messages sent to the wireless push button 124 can also include digital files which carry relevant information of pedestrian signal status as well as information about location/address details related to the traffic intersection. These messages can then be played at the wireless push button 124 which includes a speaker. If the call for registration of pedestrian signal request was initiated due to pressing of push button 116 on the receiver 101, then request for pedestrian signal is registered and an audio message is played as an acknowledgement at the pedestrian pole push button 101 for wait as in step 328. In some embodiments, the message is played at both the receiver 101 and at the wireless push button 124 together irrespective of the source of the request for pedestrian signal. The one or more arrays of LEDs 118 glow to indicate WALK or DO NOT WALK WAIT corresponding to the status of the pedestrian signal and same become visible through the translucent/transparent WALK and WAIT DO NOT WALK indications marked on the body of the receiver 101. In some embodiments, the visual indication provided to the users through the receivers 101 can be in the form of textual messages such as WALK, DO NOT WALK etc. while in some other embodiments such visual indication could be presented through graphical icons such as that of walking man to indicate walk signal and stop hand icon to indicate do not walk signal etc.

As described above, it is obvious that the one or more pole receivers with pedestrian push button of the present invention provide an integrated accessible pedestrian system which compliments and supports the functions of a wireless push button besides being able to provide an accessible pedestrian system independently.

In some embodiments, a custom built software application, also known as mobile application or mobile app, can be used to interact with the receivers 101. With the mobile app installed a mobile device can act as the wireless push button 124. The mobile app can help a mobile device communicate with the receiver 101 the same way a wireless push button 124 does. Examples of mobile device includes, but not limited to, mobile phones, smart phones, tablets etc.

Flowchart is used to describe the steps of the present invention. While the various steps in this flowchart are presented and described sequentially, some or all of the steps may be executed in different orders, may be combined or omitted, and some or all of the steps may be executed in parallel. Further, in one or more of the embodiments of the invention, one or more of the steps described above may be omitted, repeated, and/or performed in a different order. In addition, additional steps, omitted in the flowchart may be included in performing this method. Accordingly, the specific arrangement of steps shown in FIGS. 3A and 3B should not be construed as limiting the scope of the invention.

What is claimed is:

1. An integrated pedestrian access system, said system comprising one or more wireless push buttons adapted to transmit and receive wireless signals and one or more receivers connected to one or more traffic controllers and to one or more pedestrian signal heads, wherein said one or more receivers are configured to at least:
   communicate with said one or more wireless push buttons through wireless signals;
   communicate among a plurality of said one or more receivers;
   determine whether a source device from which a signal for registering a pedestrian signal request is received through said communication is said one or more wireless push buttons or said one or more receivers;
   determine a status of pedestrian signal based on one or more signals received from said one or more pedestrian signal heads;
   register said pedestrian signal request if a walk signal of a pedestrian signal is not on in the desired direction as per said status of pedestrian signal; and
   provide acknowledgement corresponding to said status of pedestrian signal through said source device.

2. The integrated pedestrian access system as in claim 1, wherein said one or more receivers communicate with said one or more pedestrian signal heads to determine whether any conflict exists in said pedestrian signal.

3. The integrated pedestrian access system as in claim 1, wherein said communication among one or more receivers is through wireless signals.

4. The integrated pedestrian access system as in claim 1, wherein said acknowledgement corresponding to said status of pedestrian signal through said source device is a vibro-tactile indication.

5. The integrated pedestrian access system as in claim 4, wherein said vibro-tactile indication is produced through vibration of a body of said one or more receivers.

6. The integrated pedestrian access system as in claim 1, wherein said acknowledgement corresponding to said status of pedestrian signal through said source device is an audible indication.

7. The integrated pedestrian access system as in claim 6, wherein said audible indication acknowledgement corresponding to said status of pedestrian signal includes one or more pieces of audio containing description of a traffic intersection.

8. The integrated pedestrian access system as in claim 6, wherein said audible indication acknowledgement corresponding to said status of pedestrian signal through said source device is played when said signal for registering a pedestrian signal request is received for more than a predetermined time.

9. The integrated pedestrian access system as in claim 1, wherein said one or more wireless push buttons are mobile devices with a custom built mobile app installed.

10. The integrated pedestrian access system as in claim 1, wherein said one or more wireless push buttons transmit a unique wireless push button identification code through said communication.

11. The integrated pedestrian access system as in claim 10, wherein said one or more receivers transmit a unique receiver identification code through said communication in response to said transmission from said one or more wireless push buttons.

12. The integrated pedestrian access system as in claim 11, wherein an association is established between each of said one or more wireless push buttons with any of said one or more receivers which respond first to said communication from said one or more wireless push buttons.

13. The integrated pedestrian access system as in claim 12, wherein said association between one or more wireless push buttons with any of said one or more receivers is done through any wireless data exchange standards.

14. A method for registering pedestrian signal requests in an integrated pedestrian access system, said system comprising one or more wireless push buttons adapted to transmit and receive wireless signals and one or more receivers connected to one or more traffic controllers and to one or more pedestrian signal heads, wherein said one or more receivers are configured to at least communicate with said one or more wireless push buttons and with a plurality of said one or more receivers, said method comprising the steps of:
   determining whether a source device from which a signal for registering a pedestrian signal request is received through said communication is said one or more wireless push buttons or said one or more receivers;
   determining a status of pedestrian signal based on signals received from said one or more pedestrian signal heads;
   registering said pedestrian signal request if a walk signal of a pedestrian signal is not on in the desired direction as per said status of pedestrian signal; and
   provide acknowledgement corresponding to said status of pedestrian signal through said source device.

15. The method for registering pedestrian signal requests in an integrated pedestrian access system as in claim 14, wherein said one or more receivers communicate with said one or more pedestrian signal heads to determine whether any conflict exists in said pedestrian signal system.

16. The method for registering pedestrian signal requests in an integrated pedestrian access system as in claim 14, wherein said communication among one or more receivers is through wireless signals.

17. The method for registering pedestrian signal requests in an integrated pedestrian access system as in claim 14, wherein said acknowledgement corresponding to said status of pedestrian signal through said source device is a vibro-tactile indication.

18. The method for registering pedestrian signal requests in an integrated pedestrian access system as in claim 17, wherein said vibro-tactile indication is produced through vibration of a body of said one or more receivers.

19. The method for registering pedestrian signal requests in an integrated pedestrian access system as in claim 14, wherein said acknowledgement corresponding to said status of pedestrian signal through said source device is an audible indication.

20. The method for registering pedestrian signal requests in an integrated pedestrian access system as in claim 19, wherein said audible indication acknowledgement corresponding to said status of pedestrian signal includes one or more pieces of audio containing description of a traffic intersection.

21. The method for registering pedestrian signal requests in an integrated pedestrian access system as in claim 19, wherein said audible indication acknowledgement corresponding to said status of pedestrian signal through said source device is played when said signal for registering a pedestrian signal request is received for more than a predetermined time.

22. The method for registering pedestrian signal requests in an integrated pedestrian access system as in claim 14, wherein said one or more wireless push buttons transmit a unique wireless push button identification code through said communication.

23. The method for registering pedestrian signal requests in an integrated pedestrian access system as in claim 22, wherein said one or more receivers transmit a unique receiver identification code through said communication in response to said transmission from said one or more wireless push buttons.

24. The method for registering pedestrian signal requests in an integrated pedestrian access system as in claim 23, wherein an association is established between each of said one or more wireless push buttons with any of said one or more receivers which respond first to said communication from said one or more wireless push buttons.

25. The method of registering pedestrian signal requests in an integrated pedestrian access system as in claim 24, wherein said association between one or more wireless push buttons with any of said one or more receivers is done through any wireless data exchange standards.

* * * * *